United States Patent Office 2,958,668
Patented Nov. 1, 1960

2,958,668

METHOD OF MAKING VINYL CHLORIDE-DIALKYL MALEATE COPOLYMER LATEX

Clide I. Carr, Jr., Naugatuck, Conn., and Gerard C. Zwick, Moundsville, W. Va., assignors to United States Rubber Company, New York, N.Y., a corporation of New Jersey No Drawing. Filed Apr. 9, 1956, Ser. No. 576,764

4 Claims. (Cl. 260—29.6)

This invention relates to latices of copolymers of vinyl chloride and dialkyl maleates having at least ten carbon atoms in each alkyl group, and to methods of making the same.

It is known to emulsion polymerize a mixture of vinyl chloride and a dialkyl maleate having up to six carbon atoms in each alkyl group to form a copolymer latex. Such latices may be produced, as shown in Hopff et al. U.S. Patent 2,187,817, by conventional emulsion polymerization procedure by agitating, as by stirring, a mixture of water, the polymerizable monomers, emulsifying agent and catalyst to form an emulsion, and then heating the emulsion at polymerization temperature to copolymerize the polymerizable monomers and form a latex. The ratio of vinyl chloride component to dialkyl maleate component in the copolymers thus formed corresponds to the ratios of the corresponding monomers in the reaction mixture, i.e. substantially all the dialkyl maleate copolymerizes with the vinyl chloride. In following this same conventional emulsion polymerization procedure with constant agitation throughout the polymerization using monomer mixtures of a major proportion of vinyl chloride and a minor proportion of higher dialkyl maleates having more than ten carbon atoms in each alkyl group in attempts to make copolymer latices which the applicants believed would have improved properties for dipping and spreading uses, the resulting products were substantially pure polyvinyl chloride homopolymer latices with the unpolymerized higher dialkyl maleate remaining as a separate phase dispersed in, or floating on the top of, the polyvinyl chloride latex, the higher dialkyl maleate completely failing to copolymerize with the vinyl chloride. Where the same conventional emulsion polymerization procedure is carried out using a monomer mixture of a major proportion of vinyl chloride and a minor proportion of di-decyl maleate, only about one-half of the di-decyl maleate can be made to copolymerize with the vinyl chloride; the remainder of the di-decyl maleate remaining as a separate phase dispersed in, or floating on top of, the latex of the copolymer of vinyl chloride and only half the starting di-decyl maleate.

According to the present invention, there may be produced stable latices of uniform copolymers of a major proportion of vinyl chloride and a minor proportion of di-alkyl maleates having 10 to 18 carbon atoms in each alkyl group where substantially all the starting dialkyl maleate monomer is copolymerized with the vinyl chloride. The dialkyl maleate acts as an internal plasticizer for the vinyl chloride polymer and such a latex provides an excellent medium for dip-coating and spreading on a wide variety of materials, such as cloth, paper, metal, plastic and wood surfaces for insulating and protective purposes. Latices of the present invention may require no added plasticizer in making the above and other articles such as sheeting, and for use in insulating wires and cables. Conventional vinyl films and coatings contain a plasticizer such as di-2-ethylhexyl phthalate or tricresyl phosphate. As the polymer ages, the plasticizer migrates to the surface and volatilizes, resulting in a hardening and cracking of the polymer; it also frequently stains adjacent materials. Furthermore, plasticizers lessen the electrical insulating properties of the polymer. Films produced according to our invention increase the electrical resistivity and decrease the power loss by large factors in comparison with such externally plasticized vinyl resins.

In preparing latices according to the present invention, we have found that substantially all the dialkyl maleate monomer having 10 to 18 carbon atoms in each alkyl group will copolymerize with the vinyl chloride to give a stable latex if the dialkyl maleate is colloidally dispersed, either alone or in admixture with the vinyl chloride, in the aqueous medium before copolymerizing with the vinyl chloride. The dialkyl maleate may be colloidally dispersed in the aqueous medium by passing the dialkyl maleate with or without the vinyl chloride, and with part or all of the emulsifying agent and water to be used in the polymerization through a colloid mill or through a homogenizer. The average particle diameter of such colloidally dispersed particles will be from 0.1 to 1 micron. Average particle diameters referred to herein are volume-average particle diameters, i.e. average particle diameters based on the volume of the particles. Colloidally dispersing the dialkyl maleate in this manner permits all the dialkyl maleate to readily copolymerize with the vinyl chloride. The dialkyl maleate may be colloidally dispersed alone in water and liquefied vinyl chloride added before polymerizing, or the dialkyl maleate and vinyl chloride may be colloidally dispersed together. Where the vinyl chloride is colloidally dispersed with the dialkyl maleate, the particles of the mixed monomers will generally be the same 0.1 to 1 micron average particle diameter as where the dialkyl maleate is dispersed alone. Where bulk liquid vinyl chloride is mixed with the previously prepared colloidal dispersion of the dialkyl maleate, the vinyl chloride readily dissolves in the colloidal particles of dialkyl maleate, maintaining the homogeneity of the colloidal dispersion, and in no way preventing the copolymerization of the dialkyl maleate with the vinyl chloride. The copolymer particles in the latex will have a volume-average particle diameter substantially the same as the average particle diameter of the colloidally dispersed monomer particles, i.e. from 0.1 to 1 micron.

The preparation of colloidal dispersions of materials in water by subjecting the materials in water to violent shearing action, as in a colloid mill where the water containing the materials to be dispersed is passed between a rotor and stator with minute clearance, or as in a homogenizer where the water containing the materials to be dispersed is forced under high pressure through a very small orifice or valve, is well known, and there are a large number of commercial machines for preparing such colloidal dispersions where the average particle diameter of the materials colloidally dispersed will be between 0.1 and 1 micron.

Vinyl esters of fatty acids may be interpolymerized with the vinyl chloride and dialkyl maleates having 10 to 18 carbon atoms in each alkyl group in making the latices of the present invention. The vinyl esters of fatty acids may be colloidally dispersed with the dialkyl maleate, or with a mixture of dialkyl maleate and vinyl chloride, or may be mixed in liquid form into the monomer feed with such previously prepared colloidal dispersions. It is most convenient to colloidally disperse all the ingredients of the polymerization mixture if the colloid mill or homogenizer used will accommodate the normally volatile vinyl chloride. Such a homogenizer was used in the examples below, but it is essential in producing the copolymer latex only to colloidally disperse the dialkyl maleate. The other copolymerizable components may be added to the colloidal dispersion of the dialkyl maleate in the polymerization vessel.

The dialkyl maleate component of the copolymer acts as an internal plasticizer for the vinyl chloride component of the copolymer. Where a vinyl ester of a higher fatty acid having 8 to 18 carbon atoms in the acid radical is co-polymerized with the vinyl chloride and dialkyl maleate, the vinyl fatty acid ester component also acts as an internal plasticizer for the vinyl chloride component similarly to the dialkyl maleate. Such vinyl ester of higher fatty acid may be added in amount up to two times the weight of the dialkyl maleate. Where a vinyl ester of a short chain fatty acid, for example vinyl acetate, is co-polymerized with the vinyl chloride and dialkyl maleate, it modifies the properties of the vinyl chloride polymer in the usual manner, as in vinyl chloride-vinyl acetate copolymers. Such vinyl acetate may be added in amount up to 20% of the weight of the vinyl chloride.

In the examples of this invention presented herein, the preferred maleate was prepared from a commercial lauryl alcohol which is primarily dodecyl alcohol and may contain up to 30% of tetradecyl and higher alcohols. Copolymers of vinyl chloride and such a maleate are indistinguishable from those prepared from pure dilauryl or didodecyl maleate, and hereafter such mixed commercial maleates, in which dilauryl maleate is the major constituent, will be referred to simply as dilauryl maleate. In the examples, vinyl stearate is the vinyl ester of a long chain fatty acid used in preparing some of the copolymers. It has been found that the amount of dilauryl maleate without vinyl stearate, and also the amount of dilauryl maleate and vinyl stearate mixture, that is copolymerized with the vinyl chloride to produce a given degree of flexibility in the vinyl chloride copolymer corresponds closely to the amount of external plasticizer, such as di-2-ethylhexylphthalate or tricresyl phosphate, needed to achieve the same flexibility on addition to polyvinyl chloride. Thus the vinyl chloride copolymers containing more than about 25% to less than 50% of copolymerized dialkyl maleate, or dialkyl maleate and vinyl stearate, and correspondingly less than 75% to more than 50% of copolymerized vinyl chloride, form soft flexible films, while those containing from 10% to 25% of dialkyl maleate, or dialkyl maleate and vinyl stearate, and correspondingly 90% to 75% of copolymerized vinyl chloride, process into somewhat stiffer films and are suitable for semi-rigid applications. Heretofore, the importance of a vinyl chloride latex for dipping has not been great because an external plasticizer, up to 40–50 percent by weight, had necessarily to be mixed into the polymer. The polymers of the present invention, in the composition range suitable for dip-coating operations, require no added plasticizer, being self-plasticized. While the copolymer latices of the present invention are particularly applicable to dipping and spreading procedures, they may be dried as by spray drying to form a powder, which may be shaped in the conventional manner by milling, calendering, pressing or other techniques. The polymers of the present invention have special utility when thus used in manners other than by direct deposition from the latex, since they require reduced amounts of external plasticizer, or no external plasticizer at all, depending on the use and the polymer composition. The staining, hardening, and other disadvantages of external migratory plasticizers are therefore absent or substantially reduced.

The catalysts used in preparing the latices of the present invention are conventional free radical producing polymerization catalysts, such as peroxygen or azo catalysts. The peroxygen catalysts may be water-soluble, e.g. inorganic peroxides, such as hydrogen peroxide and per salts, such as alkali persulfates, alkali perborates, alkali-percarbonates, or may be monomer soluble (so-called oil soluble) catalysts, e.g. organic peroxides, such as acetyl peroxide, benzoyl peroxide, acetyl benzoyl peroxide, lauroyl peroxide, cumene hydroperoxide, tertiary butyl hydroperoxide. Examples of azo catalysts are alpha, alpha-azobis-isobutyronitrile, and p-methoxybenzene diazo thio-2-naphthyl ether. It is preferred to dissolve oil-soluble catalysts in the dialkyl maleate or dialkyl maleate-containing monomers before homogenizing. Conventional catalytic amounts from 0.05% to 2% based on the polymerizable monomers may be used.

The emulsifying agents used in preparing the latices of the present invention are the conventional surface-active emulsifying agents, and may be anionic, non-ionic or cationic surface-active emulsifying agents. The amount of such emulsifying agent used is conventional, generally 1 to 10 parts, per 100 parts of polymerizable monomers.

The anionic surface-active agents that may be used are those having a general formula selected from the group consisting of R—COOM, R—SO$_3$M, and R—OSO$_3$M, where M represents alkali-metal, ammonium or substituted ammonium (amine) radical, and R represents an organic radical containing at least one group having more than 8 carbon atoms. Examples of such anionic surface-active agents are:

(1) Soaps (e.g. sodium laurate, ammonium stearate, diethanol-ammonium oleate).

(2) Alkyl sulfonates (e.g. dodecyl sodium sulfonate, cetyl potassium sulfonate).

(3) Alkyl sulfates (e.g. sodium dodecyl sulfate, sodium oleyl sulfate).

(4) Sulfonated ethers of long and short chain aliphatic groups (e.g. $C_{17}H_{33}$—O—$C_2H_4$—$SO_3$—Na).

(5) Sulfated ethers of long and short chain aliphatic groups (e.g. $C_{17}H_{33}$—O—$C_2H_4$—O—$SO_3$Na).

(6) Sulfonated alkyl esters of long chain fatty acids (e.g.

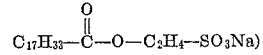

(7) Sulfated alkyl esters of long chain fatty acids (e.g.

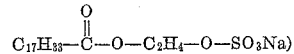

(8) Sulfonated alkyl substituted amides of long chain fatty acids (e.g.

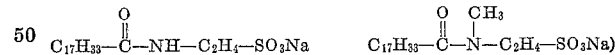

(9) Alkylated aryl sulfonates (e.g. isopropyl naphthalene sodium sulfonate, dodecyl benzene sodium sulfonate).

(10) Hydroaromatic sulfonates (e.g. tetrahydronaphthalene sodium sulfonate).

(11) Alkyl sulfosuccinates (e.g. dioctyl sodium sulfosuccinate).

(12) Aryl sulfonate-formaldehyde condensation products (e.g. condensation product of formaldehyde and sodium naphthalene sulfonate,

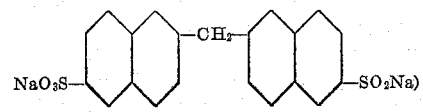

Non-ionic surface-active agents that may be used are:

(1) Monoethers of polyglycols with long chain fatty alcohols, such as reaction products of ethylene oxide or polyethylene glycol with a long-chain fatty alcohol (e.g. reaction product of ethylene oxide and oleyl alcohol, viz: $C_{18}H_{35}$—$(OC_2H_4)_n$OH where $n$ is 10 to 20).

(2) Monoesters of polyglycols with long chain fatty acids, such as reaction products of ethylene oxide or polyethylene glycol with a long chain fatty acid (e.g. reaction product of ethylene oxide or polyethylene glycol with oleic acid, viz:

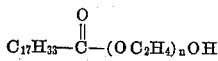

where $n$ is 10 to 20).

(3) Monoethers of polyglycols with alkylated phenols, such as reaction products of ethylene oxide or polyethylene glycol with an alkyl phenol (e.g. reaction product of ethylene oxide and isopropyl phenol, viz:

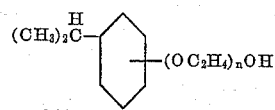

where $n$ is 10 to 20).

(4) Partial esters of polyhydric alcohols with long chain monocarboxylic (fatty and/or resin) acids (e.g. glycerol monostearate, sorbitan trioleate).

(5) Partial and complete esters of long chain monocarboxylic (fatty and/or resin) acids with polyglycol ethers of polyhydric alcohols (e.g. tristearic acid ester of polyglycol ether of sorbitan, or so-called polyoxyethylene sorbitan tristearate; hexaoleic acid ester of polyglycol ether of sorbitol, or so-called polyoxyethylene sorbitol hexaoleate).

Cationic surface-active agents that may be used are:

(1) Quaternary ammonium salts in which one of the groups attached to the nitrogen has an aliphatic group having at least 8 carbon atoms (e.g. trimethyl cetyl ammonium iodide, lauryl pyridinium chloride, cetyl dimethyl benzyl ammonium chloride, N-stearyl betaine).

(2) Amines, amids, diamines and glyoxalidines having an aliphatic group containing at least 8 carbon atoms, and their acid esters (e.g. stearylamine hydrochloride, oleyl amide, diethylethylene oleyl diamine, mu-heptadecyl N-hydroxyethyl glyoxalidine).

The following examples illustrate the invention. All parts and percentages referred to herein are by weight.

*Example I*

Two hundred ten parts of vinyl chloride and 140 parts of dilauryl maleate, in which mixture 5.25 parts of lauroyl peroxide was dissolved by heating to 30° C. to 40° C., were pumped through a homogenizer into 275 parts of water containing 5.25 parts of ammonium laurate, and the entire batch was recycled through the homogenizer using a pressure drop of 1000 pounds per square inch until the monomers were colloidally dispersed in the water. The homogenizer was capable of a pressure drop of 6000 pounds per square inch. The thus formed colloidal dispersion was transferred to a bomb which was placed in a water bath at 50° C. and the contents polymerized until there was a noticeable pressure drop from the starting pressure of 80 to 90 pounds per square inch to a pressure of not over 30 pounds per square inch which conventionally shows the completion of a vinyl chloride polymerization. The polymer latex was a homogeneous 52% solids latex, and 0.5 part of ammonium laurate was added per 100 parts of polymer as a further stabilizer. Analysis by chlorine content of the copolymer showed a composition of 57.8% copolymerized vinyl chloride component and 42.2% copolymerized dilauryl maleate component. In the absence of the homogenizing step, substantially no copolymerization of dilauryl maleate took place, the product being polyvinyl chloride latex with a supernatant layer of dilauryl maleate.

Films were spread from a sample of the vinyl chloride-dilauryl maleate copolymer latex, dried in air at room temperature, heated for 20 minutes at 250° F., and pressed into .022 inch thick slabs at 250° F. for 6 minutes at 20,000 pounds per square inch (p.s.i.) to make test pieces. The tensile strength at 25° C. was 910 p.s.i. and elongation at break was 330%. The sample showed an electrical resistivity of $0.26 \times 10^{14}$ ohm-cm.

Another portion of the latex was flocculated by freezing, the flocculate dried, and milled with 6 parts of lead carbonate per 100 parts of dried polymer at 200° F. to band and mill smoothly, and the milled sheets were pressed into .022 inch thick slabs at 250° F. for 6 minutes at 20,000 p.s.i. to make test pieces. The tensile strength at 30° C. was 668 p.s.i. and the elongation at break was 320%. The sample showed an electrical resistivity of $0.37 \times 10^{14}$ ohm-cm. The lead carbonate was added to serve as a heat stabilizer and lubricant during milling, and it had no effect on the electrical properties.

A portion of the latex was allowed to stand three months. During this period no settling or phase separation took place, showing adequate stability for commercial usage. The volume-average particle diameter of the particles of the latex and the latices of the other examples was less than 1 micron based on the volumes of the particles.

*Example II*

Two hundred ten parts of vinyl chloride, 87.5 parts of dilauryl maleate and 52.5 parts of vinyl stearate were copolymerized similarly to the binary mixture of the 210 parts of vinyl chloride and 140 parts of dilauryl maleate in Example I. The final solids content of the latex was 52.2%. Analyses by chlorine content showed the composition of the terpolymer to be 61.7% polymerized vinyl chloride component and 38.3% combined polymerized dilauryl maleate component and polymerized vinyl stearate component. Test pieces from air dried films, as in Example I showed tensile strength at 25° C. of 930 p.s.i., elongation at break of 320%; and electrical resistivity of $.35 \times 10^{14}$ ohm-cm.

*Example III*

A bipolymer latex was prepared from a vinyl chloride to dilauryl maleate monomer ratio of 4 to 1 in a manner similar to the copolymer in Example I from 320 parts of vinyl chloride, 80 parts of dilauryl maleate, 4 parts of lauroyl peroxide, 240 parts of water and 5.25 parts of ammonium laurate. The total solids content of the latex was 44.4%. Analysis showed 82% of vinyl chloride component and 18% dilauryl maleate component.

For testing physical properties, a portion of the latex was spread, dried to granular form, and molded into sheets at 350° F. The molded sheets had a tensile strength of 5780 p.s.i. and an elongation at break of 140% at 25° C., the electrical resistivity was $20.8 \times 10^{14}$ ohm-cm. The latex after five months standing was stable and showed no tendency to separate into phases.

EXAMPLE IV

A vinyl chloride-dilauryl maleate copolymer latex was prepared using a water-soluble catalyst as follows:

A mixture of 250 parts of vinyl chloride, 160 parts of dilauryl maleate and 6 parts of dissolved ammonium laurate were passed through the homogenizer into 300 parts of water containing 2 parts of potassium persulfate and the entire batch was recycled through the homogenizer to colloidally disperse the particles of the monomer mixture. The homogenized batch was heated in a bomb at 50° C. to the usual pressure drop to not over 30 pounds per square inch pressure.

The latex had a total solids content of 43.6% and analysis of the copolymer showed 64.2% vinyl chloride component and 35.8% dilauryl maleate component. Test films prepared from the spread latex showed tensile strength of 602 p.s.i. and elongation at break of 330% at 40° C., the electrical resistivity was $0.068 \times 10^{14}$ ohm-cm. The latex was stable, and there was no indication of floc after several months.

EXAMPLE V

Two hundred fifty-two parts of vinyl chloride, 70 parts of dilauryl maleate, 70 parts of vinyl stearate, and 8 parts of vinyl acetate (a 63/17.5/17.5/2 monomer mix) in which 4.8 parts of lauroyl peroxide had been dissolved was passed through a homogenizer into 280 parts of water containing 4 parts of sodium lauryl sulfate and 8 parts of ammonium hydroxide, and the entire batch was recycled through the homogenizer until the particles of the monomer mixture were colloidally dispersed in the aqueous medium. The homogenized colloidal dispersion was polymerized at 50° C. to the usual pressure drop to not over 30 pounds per square inch pressure. The total solids content of the latex was 48%.

EXAMPLE VI

A mixture was prepared of 280 parts of water, 6.75 parts of ammonium laurate, 84 parts of dilauryl maleate, 84 parts of vinyl stearate, and 6.75 parts of lauroyl peroxide. Into this mixture in a closed vessel was pumped 252 parts of vinyl chloride. The entire contents of the vessel was passed once, without recycling, through the homogenizer at the same 1000 p.s.i. pressure drop as in the previous examples. Polymerization of the homogenized batch was carried out at 50° C. until the usual pressure drop to not over 30 pounds per square inch pressure. A stable latex of 53.3% solids content resulted.

Where a colloid mill, which is not pressure enclosed, is used to prepare the colloidal dispersion, the vinyl chloride, which is a gas at room temperature, cannot be homogenized with the other materials. It is only necessary to homogenize the dialkyl maleate by passing through the colloid mill with water and any of the other ingredients of the polymerization recipe which are not volatile at atmospheric pressure. The vinyl chloride and any other unhomogenized ingredients may be added to the homogenized dialkyl maleate colloidal dispersion in a closed vessel and the polymerization carried out as in the examples above at conventional temperature from 25° C. to 60° C.

In view of the many changes and modifications that may be made without departing from the principles underlying the invention, reference should be made to the appended claims for an understanding of the scope of the protection afforded the invention.

Having thus described our invention, what we claim and desire to protect by Letters Patents is:

1. The method of making a copolymer latex which comprises heating at temperature from 25° C. to 60° C. a polymerization mixture of water, surface-active emulsifying agent, free radical producing polymerization catalyst, and polymerizable monomers consisting of more than 50% by weight of vinyl chloride, 10% to less than 50% by weight of dialkyl maleate in which each alkyl group has 10 to 18 carbon atoms, vinyl acetate in amount up to 20% by weight of said vinyl chloride, and a vinyl ester of higher fatty acid having 8 to 18 carbon atoms in the acid radical, said vinyl ester of higher fatty acid being in amount up to two times the weight of said dialkyl maleate, the dialkyl maleate in said polymerization mixture being colloidally dispersed in said water as droplets having a volume-average particle diameter between 0.1 and 1 micron.

2. The method of making a copolymer latex which comprises heating at temperature from 25° C. to 60° C. a polymerization mixture of water, surface-active emulsifying agent, free radical producing polymerization catalyst, and polymerizable monomers consisting of more than 50% by weight of vinyl chloride, 10% to less than 50% by weight of dialkyl maleate in which each alkyl group has 10 to 18 carbon atoms, vinyl acetate in amount up to 20% by weight of said vinyl chloride, and a vinyl ester of higher fatty acid having 8 to 18 carbon atoms in the acid radical, said vinyl ester of higher fatty acid being in amount up to two times the weight of said dialkyl maleate, all such polymerizable monomers being colloidally dispersed in said water as droplets having a volume-average particle diameter between 0.1 and 1 micron.

3. The method of making a copolymer latex which comprises heating at a temperature from 25° C. to 60° C. a polymerization mixture comprising water, surface-active emulsifying agent, free radical producing polymerization catalyst, and polymerizable monomers consisting of more than 50% by weight of vinyl chloride and 10% to less than 50% by weight of dilauryl maleate, said dilauryl maleate being colloidally dispersed in said water as droplets having a volume-average particle diameter between 0.1 and 1 micron.

4. The method of making a copolymer latex which comprises heating at a temperature from 25° C. to 60° C. a polymerization mixture comprising water, surface-active emulsifying agent, free radical producing polymerization catalyst, and polymerizable monomers consisting of more than 50% by weight of vinyl chloride and 10% to less than 50% by weight of dilauryl maleate, said vinyl chloride and said dilauryl maleate being colloidally dispersed in said water as droplets having a volume-average particle diameter between 0.1 and 1 micron.

References Cited in the file of this patent

UNITED STATES PATENTS

| | | |
|---|---|---|
| 2,400,808 | Burns | May 21, 1946 |
| 2,731,449 | Rowland et al. | Jan. 17, 1956 |
| 2,845,404 | Garner et al. | July 29, 1958 |

FOREIGN PATENTS

| | | |
|---|---|---|
| 584,691 | Great Britain | Jan. 21, 1947 |
| 467,383 | Canada | Aug. 15, 1950 |
| 118,609 | Australia | June 13, 1944 |

OTHER REFERENCES

Bovey: "Emulsion Polymerization," High Polymers, volume IX (1955), Interscience Publishers, Inc., New York, page 16.